March 31, 1970    H. B. BERG ET AL    3,503,193
BAG SUPPORTING ATTACHMENT FOR ROTARY MOWERS
Filed Oct. 11, 1967    2 Sheets-Sheet 1
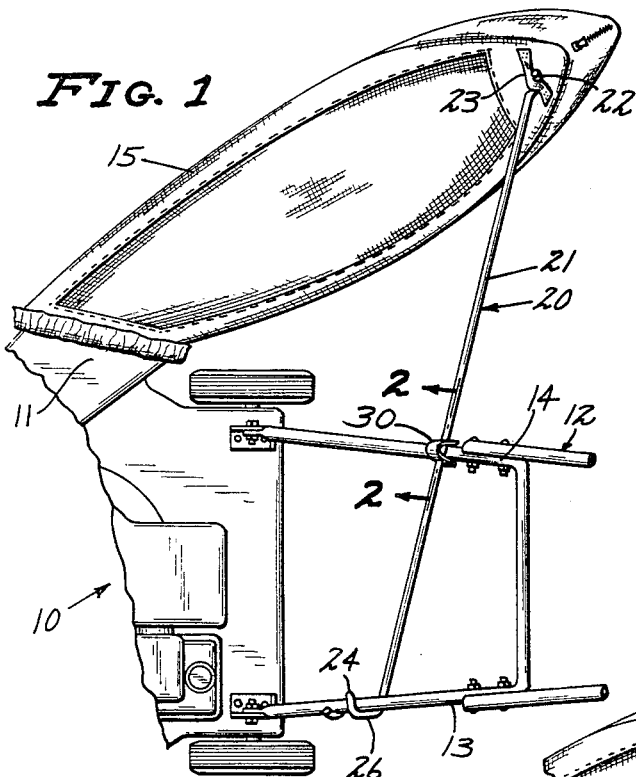
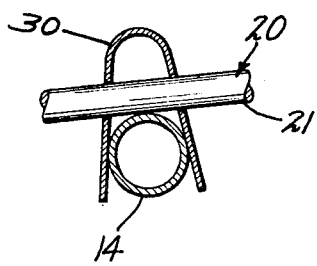
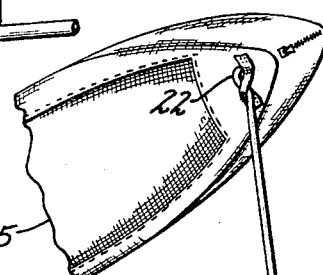
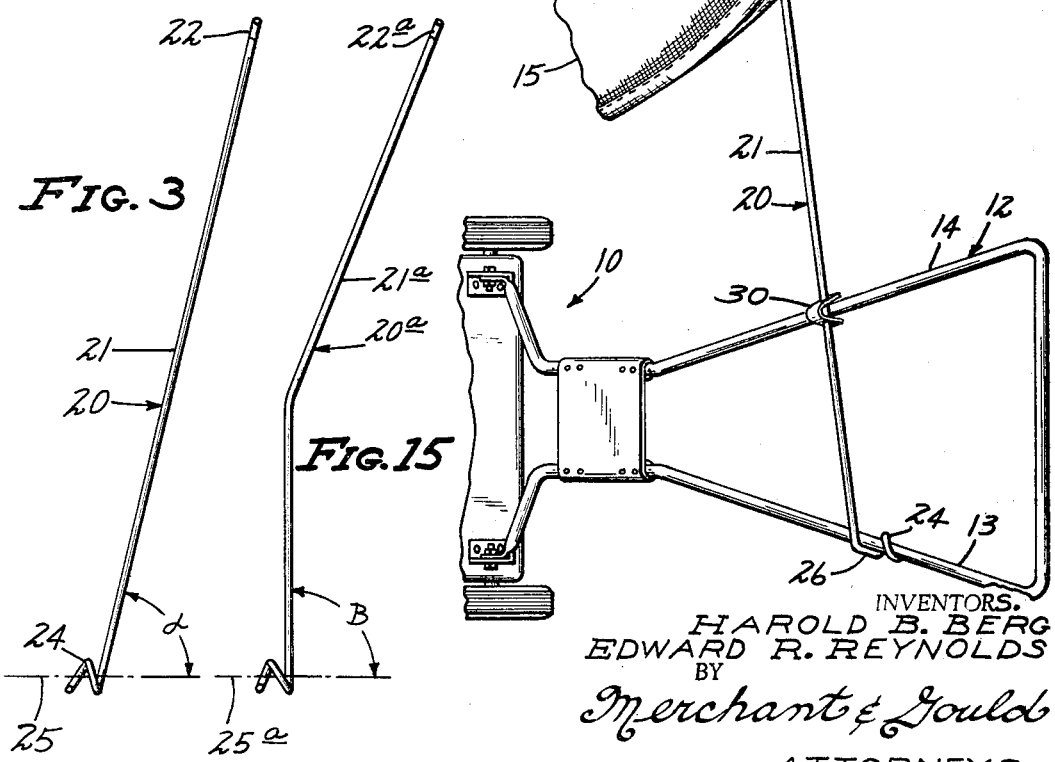
INVENTORS.
HAROLD B. BERG
EDWARD R. REYNOLDS
BY
Merchant & Gould
ATTORNEYS March 31, 1970    H. B. BERG ET AL    3,503,193
BAG SUPPORTING ATTACHMENT FOR ROTARY MOWERS
Filed Oct. 11, 1967    2 Sheets-Sheet 2
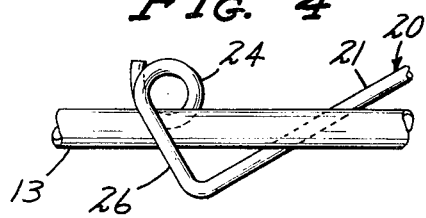
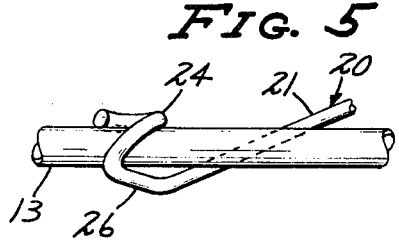
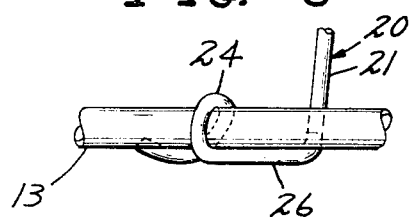
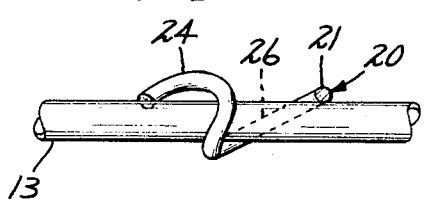
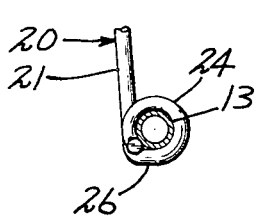
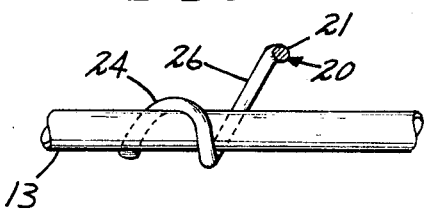
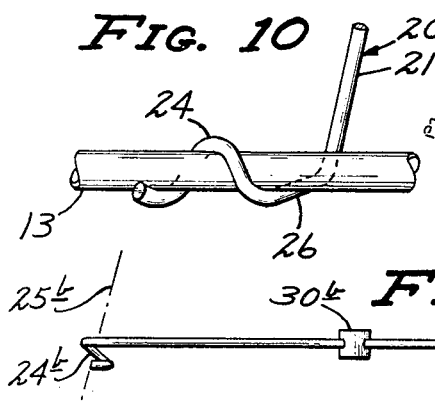
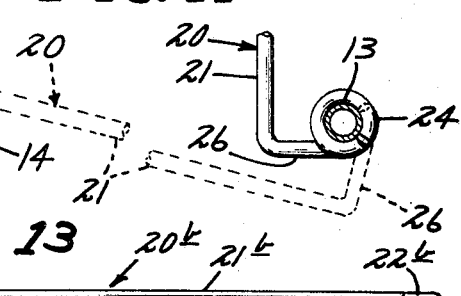
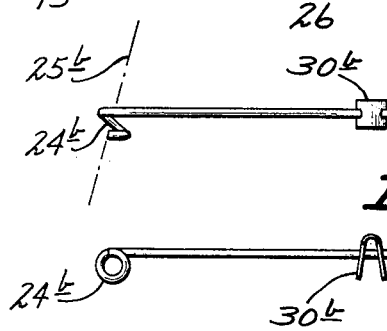
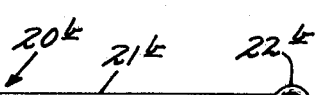
INVENTORS.
HAROLD B. BERG
EDWARD R. REYNOLDS
BY
Merchant & Gould
ATTORNEYS

United States Patent Office 3,503,193
Patented Mar. 31, 1970

3,503,193
BAG SUPPORTING ATTACHMENT FOR ROTARY MOWERS
Harold B. Berg, 1110 Welcome Circle, Golden Valley, Minneapolis, Minn. 55422, and Edward R. Reynolds, St. Paul, Minn.; said Reynolds assignor to said Berg
Filed Oct. 11, 1967, Ser. No. 674,430
Int. Cl. A01d 35/22
U.S. Cl. 56—202
7 Claims

ABSTRACT OF THE DISCLOSURE

An elongated rod having a generally helical bend at one end thereof with the axis positioned at angle to the longitudinal axis of the main body of the rod such that the rod extends transversely outwardly from the handle of a mower when the helical bend is positioned in encircling engagement with a longitudinally extending portion of the handle. The elongated rod is formed so that it can be attached to substantially any mower handle to support a grass retaining bag therefrom.

BACKGROUND OF THE INVENTION

Field of the invention

In rotary mowers of the type utilized on lawns and the like, it is the present practice to catch the grass clippings as they leave the mower and to dispose of the clippings so that the lawn is not damaged through accumulation thereof. In general, these clippings are caught and retained in a bag removably attached to the mower and engaged over the discharge outlet thereof. In many mowers, the discharge outlet is directed generally rearwardly and the rearmost end of the grass retaining bag is supported by apparatus attached to the handle of the rotary mower.

Description of the prior art

In the prior art, an elongated member is permanently affixed to the handle and extends transversely outwardly to engage the rearmost end of the bag. In general, the elongated member is specifically designed for one particular type of rotary mower and cannot be attached to other types. The elongated member is either attached to the mower by a complicated attaching apparatus, or by modifying the mower in some fashion. In some prior art, elongated members have been devised which can be attached to several types of mowers, but these members are extremely complicated and expensive.

SUMMARY OF THE INVENTION

The present invention is an improved grass retaining bag supporting attachment for rotary mowers of the type having a handle partially formed from two spaced apart cylindrical members including an elongated rod having a helically curved portion at one end thereof adapted to encircle one member of the handle so that the remainder of the rod extends transversely outwardly to partially overlie a portion of the other member and engage the outermost end of the bag adjacent the other end thereof.

It is an object of the present invention to provide a new and improved grass retaining bag supporting attachment for rotary mowers.

It is a further object of the present invention to provide an improved supporting attachment which can be affixed to substantially any rotary mower.

It is a further object of the present invention to provide an improved supporting attachment which can be affixed to the handle of a rotary mower in several different positions to comply with various types of mowers and bags.

These and other objects of this invention will become apparent to those skilled in the art upon consideration of the accompanying specification, claims, and drawings.

BRIEF DESCRIPTION OF THE DRAWINGS

Referring to the drawings, wherein like characters indicate like parts throughout the figures:

FIGURE 1 is a fragmentary view in top plan of a rotary mower with the bag supporting attachment affixed thereto;

FIGURE 2 is a view similar to FIGURE 1 with the bag supporting attachment affixed to a different type of mower in a different position;

FIGURE 3 is a plan view of the bag supporting attachment detached from the mower;

FIGURES 4–11 are sequential views illustrating the manner in which the bag supporting attachment, illustrated in FIGURE 1, is affixed to the handle of a rotary mower;

FIGURE 12 is an enlarged sectional view as seen from the line 12—12 in FIGURE 1;

FIGURE 13 is a plan view of another embodiment of the bag supporting attachment;

FIGURE 14 is a view in side elevation of the bag supporting attachment illustrated in FIGURE 13; and FIGURE 15 is a view similar to FIGURE 3 illustrating another embodiment of the supporting attachment.

DESCRIPTION OF THE PREFERRED EMBODIMENT

Referring to FIGURE 1, the numeral 10 generally designates a rotary mower having a discharge outlet 11 and a handle 12 with first and second spaced apart cylindrical members 13 and 14, respectively. An elongated grass retaining bag 15 is attached in communication with the discharge outlet 11 so as to receive the grass clippings egressing therefrom. The discharge outlet 11 and the bag 15 extend generally rearwardly from the mower 10 and transversely of the handle 12. A supporting attachment, generally designated 20, is affixed to the handle 12 and engaged with the outermost end of the bag 15 to maintain the bag 15 above the ground and in a preferred position with respect to the discharge outlet 11.

The supporting attachment 20 includes an elongated rod 21 having a hook 22 at one end thereof adapted to engage a loop 23 fixedly attached to the outer end of the bag 15. The opposite end of the elongated rod 21 has a generally helically curved portion 24 attached thereto. In this embodiment, the hook 22 and the helically curved portion 24 are integrally attached to the elongated rod 21, but it should be understood that they might be formed separately and attached in a variety of ways. Referring to FIGURE 3 with a generally straight elongated rod 21, the axis of the helically curved portion 24, illustrated by a broken line 25, forms an angle alpha with the longitudinal axis of the elongated rod 21, which angle alpha will generally be in the range of and including 45° to 90°. In an embodiment of the supporting attachment 20, illustrated in FIGURE 15 (wherein like portions are indicated with like numerals including an "a" to designate another embodiment), the elongated rod 21a has a bend in the central portion thereof, and the axis 25a of the helically curved portion 24a forms an angle beta with the longitudinal axis of the main portion of the body of the elongated rod 21a, which angle beta is approximately 90°. Thus, because of the bend in the central portion of the elongated rod 21a, the hook 22a at the opposite end thereof will be positioned at approximately the same general position as the hook 22 relative to the handle 12 of the mower 10.

In the embodiment of the supporting attachment 20, illustrated in FIGURE 1–12, the helically curved portion 24 is attached to the elongated rod 21 by an additional bent portion 26. The bent portion 26 has two legs extending outwardly at approximately 90° to each other, one of which is integrally attached to the end of the elongated rod 21, and the other of which is integrally attached to the helically curved portion 24. As will be seen presently, the bent portion 26 maintains the end of the elongated rod 21 spaced from the first member 13 of the handle 12 a sufficient distance to allow the elongated rod 21 to be rotated slightly about an axis parallel with the longitudinal axis thereof to engage and disengage the helically curved portion 24 with the first member 13 of the handle 12. The inclusion of the bent portion 26 between the helically curved portion 24 and the elongated rod 21 allows the helically curved portion 24 to extend a few additional degrees around the first member 13 so that a force can be applied to the hook 22 in either direction, generally perpendicular to the longitudinal axis of the elongated rod 21, and generally in the plane of the elongated rod 21 and the axis 25 of the helically curved portion 24. Since a force can be applied to the hook 22 in either direction, as described above, the helically curved portion 24 of the supporting attachment 20 can be affixed to the first member 13 either as illustrated in FIGURE 1, or alternatively, in the reverse position illustrated in FIGURE 2. Because the supporting attachment 20 is reversible on the handle 12, the supporting attachment 20 can be affixed to a greater variety of mowers and bags.

FIGURES 4–11 illustrate the various steps of engaging the supporting attachment 20 on the handle 12. FIGURE 4 and FIGURE 5, which is a view similar to FIGURE 4 rotated 90° about the longitudinal axis of the member 13, illustrate the first step for engaging the supporting attachment 20 on the handle 12, wherein the helically curved portion 24 is engaged over the first member 13 with the axis approximately perpendicular. FIGURE 6 and FIGURE 7, which is a view similar to FIGURE 6 rotated 90° about the axis of the member 13, illustrate the second step, wherein the supporting attachment 20 is rotated about the axis 25 of the helically curved portion 24 while the helically curved portion 24 is moved to partially encircle the first member 13. It should be noted that the free end of the helically curved portion 24 is not yet in encircling engagement with the member 13, but the end of the elongated rod 21 and the bent portion 26 affixed thereto are engaged with the member 13. In the third step illustrated in FIGURE 9 and FIGURE 10, which is similar to FIGURE 9 but rotated 90° about the longitudinal axis of the member 13, a twisting motion is applied to the elongated rod 21 so that the free end of the helically curved portion 24 moves into encircling engagement with the member 13, and the bent portion 26 extends away from the member 13 so that the end of the elongated rod 21 is spaced from the member 13. In this position, the helically curved portion 24 encircles the member 13 through an angle slightly greater than 360°. End views, as seen from left to right in FIGURES 6 and 10, are provided in FIGURES 8 and 11, respectively. Once the elongated rod 21 is twisted so that the helically curved portion encircles the member 13, the elongated rod 21 is moved downwardly about the longitudinal axis of the member 13 so that it rests in overlying relationship on the second member 14, as illustrated in dotted lines in FIGURE 11.

A generally U-shaped spring clip 30 having an opening through each leg thereof is mounted on the supporting attachment 20 with the elongated rod 21 extending through the openings therein. The spring clip 30 is constructed with the legs thereof normally biased away from each other so that the edges of the openings therethrough frictionally engage the elongated rod 21 and prevent longitudinal sliding movements of the spring clip 30 on the elongated rod 21. To move the spring clip 30 longitudinally along the elongated rod 21, the two legs are moved toward each other to generally align the openings therethrough. The spring clip 30 is further constructed so that the legs extend a substantial distance past the elongated rod 21 to partially encircle the second member 14. When the second member 14 is positioned between the legs of the spring clip 30, as illustrated in FIGURE 12, the legs are maintained separated and longitudinal movement of the spring clip 30 along the elongated rod 21 is substantially prevented. Thus, the spring clip operates to maintain the elongated rod 21 in a particular position relative to the second member 14 and to prevent relative longitudinal sliding movements therebetween. It should be understood that the spring clip 30 is optional, and in the preferred embodiment, the natural force produced by the bag 15 on the hook 22 of the elongated rod 21 produces sufficient frictional engagement of the helically curved portion 24 on the first member 13 so that longitudinal sliding movements between the supporting attachment 20 and the handle 12 are prevented.

It should also be understood that the various bends and portions of the supporting attachment 20 described herein could be modified slightly and still be within the scope of this invention. For example, the bent portion 26 might be formed with a generally helical configuration having a radius somewhat larger than the helically curved portion 24. Also, as illustrated in FIGURES 13, and 14, wherein a different embodiment of the supporting attachment is illustrated and like parts are identified with like numbers including a "b" to illustrate a different embodiment, the bent portion 26 is eliminated, and a spring clip 30b is relied upon to prevent relative longitudinal sliding movements between the supporting attachment 20b and a mower handle. This is especially true when the force produced by the weight of the bag 15 is applied generally upwardly in the plane of FIGURE 13 against the hook 22b.

Thus, a grass retaining bag supporting attachment for rotary mowers is disclosed which can be readily attached to the handle of substantially any rotary mower so as to support the grass retaining bag in an operating position. The supporting attachment is relatively simple and inexpensive to construct, and is extremely simple to use.

What is claimed is:

1. A grass retaining bag supporting attachment for rotary mowers and the like comprising:
    (a) an elongated rod having one end adapted to engage a bag adjacent the outermost end thereof;
    (b) a generally helically curved portion fixedly attached to the opposite end of said rod and adapted to encircle a portion of a member of the handle of a mower with a portion of the main body between the one end and the helically curved portion of said rod adapted to engage in overlying relationship a portion of a second member of the handle spaced from the first portion of the handle for substantially preventing downward movement of the one end of said rod; and
    (c) said helically curved portion being attached to said rod with said rod extending outwardly at an angle sufficient to maintain the bag generally taut and above the ground.

2. A grass retaining bag supporting attachment as set forth in claim 1 having in addition a clip adjustably attached to the main body of the rod and adapted to engage the second member of the handle in a partially encircling position for substantially preventing sliding movement of said rod longitudinally along the handle.

3. A grass retaining bag supporting attachment as set forth in claim 1 wherein the angle between the axis of the helically curved portion and the longitudinal axis of the rod lies in the range of approximately 45° to 90°.

4. A grass retaining bag supporting attachment as set forth in claim 1 wherein a portion of the rod adjacent the helically curved portion is bent so that the longitudinal axis thereof extends approximately perpendicular to the axis of a second portion of the rod immediately adjacent thereto.

5. A grass retaining bag supporting attachment as set forth in claim 1 wherein the rod and the helically curved portion are formed so the attachment can be engaged on a mower handle with the rod extending over the first portion of the handle and so the attachment can be engaged reversibly on the mower handle with the rod extending under the first portion.

6. Grass retaining apparatus for rotary mowers having an outwardly extending handle with at least a portion thereof formed by two spaced apart elongated cylindrical members comprising:
 (a) a grass retaining bag attached to a rotary mower in communication with the discharge outlet thereof;
 (b) an elongated rod having one end engaged to said bag adjacent the outermost end thereof;
 (c) a generally helically curved portion fixedly attached to one end of said rod and encircling a portion of one of the cylindrical members of the handle with a portion of the rod engaging in overlying relationship a portion of the second cylindrical member of the handle; and
 (d) said helically curved portion being attached to said rod with said rod extending outwardly at an angle sufficient to maintain said bag generally taut and above the ground.

7. Grass retaining apparatus as set forth in claim 6 wherein the elongated rod and the helically curved portion are integrally formed.

References Cited

UNITED STATES PATENTS

| | | | |
|---|---|---|---|
| 2,970,421 | 2/1961 | Krewson | 56—202 |
| 3,132,457 | 5/1964 | Slemmons | 56—202 |
| 3,154,993 | 11/1964 | Andersen | 84—240 |

ANTONIO F. GUIDA, Primary Examiner

G. E. McNEILL, Assistant Examiner